United States Patent [19]

McGrady et al.

[11] Patent Number: 4,826,247

[45] Date of Patent: May 2, 1989

[54] SYSTEM FOR ASSISTING A FIGHTER PILOT IN CHECKING THE SIX-O'CLOCK POSITION

[75] Inventors: Michael B. McGrady, Federal Way; James M. Huber, Seattle; Gerald F. Herndon, Bellevue; Stephen F. Sielaff, Federal Way; Jerry T. Shearer, Seattle, all of Wash.

[73] Assignee: The Boeing Company, Seattle, Wash.

[21] Appl. No.: 203,945

[22] Filed: Jun. 8, 1988

Related U.S. Application Data

[63] Continuation of Ser. No. 912,778, Sep. 26, 1986.

[51] Int. Cl.[4] .................................................. A47C 7/18
[52] U.S. Cl. .............................. 297/314; 297/DIG. 3; 297/284; 5/61
[58] Field of Search ............... 297/284, 312, 314, 456, 297/458, DIG. 3; 5/61, 453, 454, 455, 456

[56] References Cited

U.S. PATENT DOCUMENTS

| | | | |
|---|---|---|---|
| 3,192,541 | 7/1965 | Moore . | |
| 3,477,071 | 11/1969 | Emmerson . | |
| 3,485,240 | 12/1969 | Fountain | 5/456 X |
| 3,492,988 | 2/1970 | De Mare | 5/61 X |
| 3,795,021 | 3/1974 | Moniot | 297/DIG. 3 |
| 3,966,146 | 6/1976 | Roberts | 257/284 X |
| 3,983,640 | 10/1976 | Cardullo et al. . | |
| 4,306,322 | 12/1981 | Young et al. | 297/284 X |
| 4,321,044 | 3/1982 | Karon . | |
| 4,466,662 | 8/1984 | McDonald et al. . | |
| 4,552,402 | 11/1985 | Huber et al. . | |

FOREIGN PATENT DOCUMENTS

| | | | |
|---|---|---|---|
| 3200139 | 10/1982 | Fed. Rep. of Germany | 297/DIG. 3 |
| 3334864 | 4/1985 | Fed. Rep. of Germany | 297/DIG. 3 |
| 1456058 | 9/1966 | France | 5/455 |
| 2536975 | 6/1984 | France | 297/DIG. 3 |

Primary Examiner—Peter A. Aschenbrenner
Attorney, Agent, or Firm—Seed and Berry

[57] ABSTRACT

A system for assisting a fighter pilot in checking the six-o'clock position. By differentially inflating bladders placed under the seat cushion of the ejection seat of a fighter, the seat cushion can be rotated to the pilot's left or right to aid the pilot in checking the space directly behind the fighter. A system controller, responsive to actions by the pilot, causes the differential inflation of the bladders and controls the rotation of left and right harness straps. The system controller can actuate solenoid valves to control the bladder inflation or can mechanically rotate a fluid valve to control the bladder inflation. The bladders can be fabricated from a resilient material so that they automatically deflate when they are vented to the ambient atmosphere and their size can be limited by placing the bladders inside a resilient casing that has a non-resilient web connecting the opposed surface of the casing.

11 Claims, 3 Drawing Sheets

SYSTEM FOR ASSISTING A FIGHTER PILOT IN CHECKING THE SIX-O'CLOCK POSITION

This application is a continuation of U.S. patent application Ser. No. 912,778, filed Sept. 26, 1986.

TECHNICAL FIELD

This invention relates to seats for fighter aircraft, and more particularly, to a seat that rotates the torso of a pilot under high g conditions to allow the pilot to view the aircraft's six-o'clock position.

BACKGROUND ART

Fighter airplanes often operate under high g conditions, often under circumstances where the onset of the high g condition occurs very rapidly. Current high-performance airplanes, such as the F-15 and F-16, are capable of sustaining g forces in excess of +9 g; and the "g-onset," i.e., the rate of increase in the acceleration forces, can exceed 6 g/second. These high g and high g-onset conditions can cause a reduction in the performance of a pilot and can result in fatigue, loss of peripheral vision, and potential loss of consciousness. It is expected that future fighter airplanes will be capable of sustaining even higher g forces, possibly as high 13-15 g. Yet existing anti-g protective measures, such as positive pressure breathing, anti-g suits, and rapid response g-valves, are generally able to allow pilots to sustain only about 7 g.

Although much air-to-air combat occurs between aircraft at great distances from each other, the ability to engage in close air-to-air combat, i.e., "dog fights," is nevertheless a critical requirement of high-performance fighter aircraft. When engaging in a dog fight, it is necessary for the pilot to frequently check the rear or "six-o'clock" position in order to be sure that an enemy aircraft is not behind the aircraft. The pilot will normally move one shoulder forwardly to rotate his torso in one direction and then rotate his head the remaining distance in the same direction in order to check the six-o'clock position. However, it can be extremely difficult for the pilot to rotate his head and body under high g forces thus making a pilot less able to check the 6-o'clock position.

In order to allow pilots to sustain g forces in the neighborhood of 9-15 g, it is necessary to place the pilot in a reclined position. However, permanently placing the pilot in a reclined position can reduce the pilot's visibility and otherwise impair the performance of the pilot. Consequently, articulating or reclining seats have been proposed in which the seats are normally placed in an upright position under low g conditions. However, when the g forces reach a predetermined value, such as in excess of 7 g, the seat automatically articulates or reclines to angles of 50°-65° to provide the needed protection. It is expected that articulating or reclining seats will thus allow the pilot to sustain g forces as great as 13-15 g.

When the pilot is reclining under high g conditions, the pilot must still have the ability to check the six-o'clock position, yet it is even more difficult for the pilot to check the 6 o'clock position when he is in a reclined position since the pilot must now lift his chest and one shoulder. Yet the weight of his chest and shoulder has greatly increased because the g forces are acting in a direction that forces his torso against the seat back.

Prior attempts to assist the pilot in checking the six-o'clock position under high g conditions have relied upon mechanical movement of the seat back. This approach adds weight to the seat and, because of its complexity, decreases the reliability and maintainability of the system.

DISCLOSURE OF THE INVENTION

The primary object of the invention is to provide an aircraft seat for fighter airplanes that assists the pilot in checking the six-o'clock position while reclined under high g conditions.

Another object of the invention is to provide a relatively lightweight system for allowing the pilot to check the six-o'clock position.

It is still another object of the invention to provide a relatively simple system for allowing the pilot to check the six-o'clock position under high g conditions so that the system is reliable and easily maintained.

It is a still further object of the invention to provide a system for assisting the pilot in checking the six-o'clock position that is easily adapted to specific operating conditions, such as a specific angle of rotation imparted to the pilot's torso.

These and other objects of the invention are provided by a system for rotating the body of a pilot reclining in a fighter airplane seat. The system includes first and second air-impermeable bladders positioned on the back of the seat and spaced transversely across and supporting the back of the pilot. A control mechanism differentially inflates and deflates the bladders so that the first bladder is selectively inflated to degree that is greater than any inflation of the second bladder in order to rotate the torso of the pilot away from the first bladder and toward the second bladder. Similarly, the second bladder may be selectively inflated to a degree that is greater than any inflation of the first bladder to rotate the torso of the pilot in the opposite direction, away from the second bladder and toward the first bladder. Although the system may be implemented using only two bladders, three or more bladders spaced apart across the back of the pilot may also be used. The inflated thickness of the center bladder is intermediate the inflated thicknesses of the end bladders so that when the torso of the pilot is rotated, it is evenly supported at at least three spaced-apart locations. The control mechanism for the bladders may be a switch mounted on each of the airplane's rudder pedals in order to allow the pilot to actuate the control system with his feet. The bladders could, of course, be controlled by other means. For example, in a "fly-by-wire" airplane the normal rudder function could be altered automatically during high g conditions so that the bladders are controlled by actuation of the rudder pedals. The control mechanism may be a rotary valve that connects a source of compressed fluid to the bladders or individual solenoid valves that may be actuated in pairs in the event that two or more bladders are simultaneously inflated. The bladders may be formed by a resilient casing and a plurality of flexible, non-elastic webs extending across the thickness of the bladder so that the length of the webs controls the thickness of the bladder.

BEST MODE FOR CARRYING OUT THE INVENTION

Figure 1A:
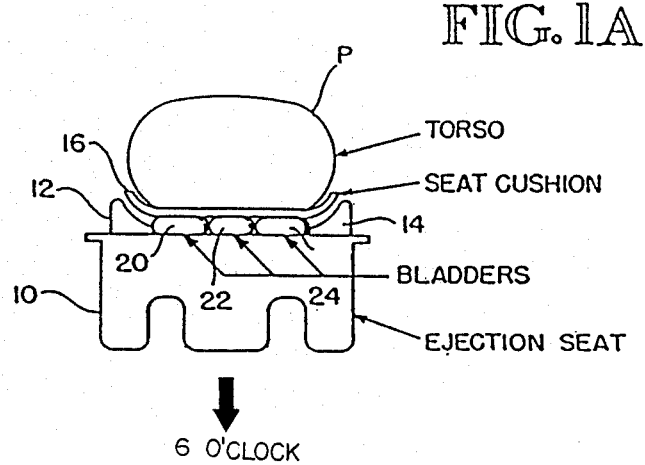
FIG. 1 s a schematic illustrating the operation of the system for assisting a pilot in checking the six-o'clock position.

The basic concept of the system for assisting a pilot in checking the six-o'clock position is illustrated in FIG. 1. The system is adapted for use with a seat for fighter aircraft seat, which is usually an ejection seat. The seat 10 is of conventional design and includes a pair of side supports 12-14 and a seat cushion 16 conforming at its lateral edges to the curvature of the side supports 12, 14. The torso of the pilot P rests against the seat cushion 16.

In accordance with the inventive system, three air-impermeable bladders 20, 22, 24 are positioned between the seat cushion 16 and the back of the ejection seat 10. Although the embodiment illustrated in FIG. 1 utilizes three bladders 20-24, it will be understood from the more detailed explanation below that as few as two bladders can be used. Also, the system may utilize more than three bladders.

Although the ejection seat 10 may be of any conventional design having a fixed angle of inclination, the inventive system is most advantageously used with an ejection seat 10 that articulates or inclines when the pilot is subject to high g forces. Under these circumstances, it is extremely difficult for the pilot P to lift his torso from the seat cushion 16 in order to allow the six-o'clock position to be checked. However, it will be understood that the inventive system may also be used with stationary seats rather than with ejection seats as well as with upright seats rather than reclined seats. Also, of course, the inventive system may be used with seats in which the entire pilot capsule is ejected rather than just the seat.

Figure 1B:
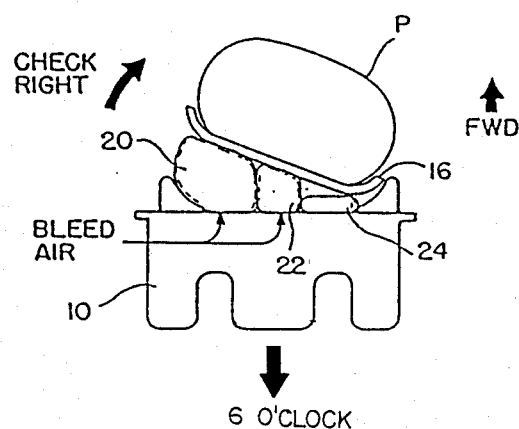

In accordance with the invention, when the pilot wishes to check to the right, compressed fluid, such as bleed air, is directed to the leftmost bladder 20 and the middle bladder 22, while the rightmost bladder 24 remains uninflated. The seat cushion 16 then rotates to the right in a clockwise direction, as illustrated in FIG. 1B. The inflated thickness of the leftmost bladder 20 is approximately twice that of the inflated thickness of the center bladder 22 so that the bladders 20, 22, 24 evenly support the torso of the pilot P substantially along the entire transverse area of the seat cushion 16.

When the pilot wishes to check to the left, the rightmost bladder 24 and the center bladder 22 are inflated, while the leftmost bladder 20 remains uninflated. The seat cushion 16 then rotates to the left in a counterclockwise direction, as illustrated in FIG. 1C.

Figure 1C:
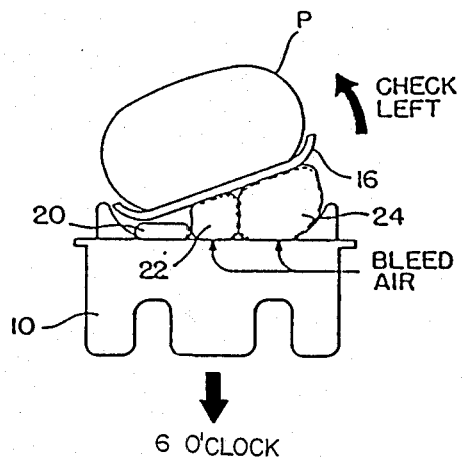

It will be apparent from FIGS. 1B and 1C that, although the embodiment illustrated utilizes three bladders 20, 22, 24, the torso of the pilot P can be rotated using only two bladders, as long as they are differentially inflated. Similarly, although only two bladders are required, the inventive system may utilize more than three bladders. Further, although the bladders shown in the embodiment of FIG. 1 are inwardly tapered from top to bottom and in the case of the outer bladders 20, 24, from outer edge to inner edge, other bladder shapes may be used. Further, it may be desirable to position bladders behind the pilot at other locations, such as behind his or her neck or head.

Figure 2:
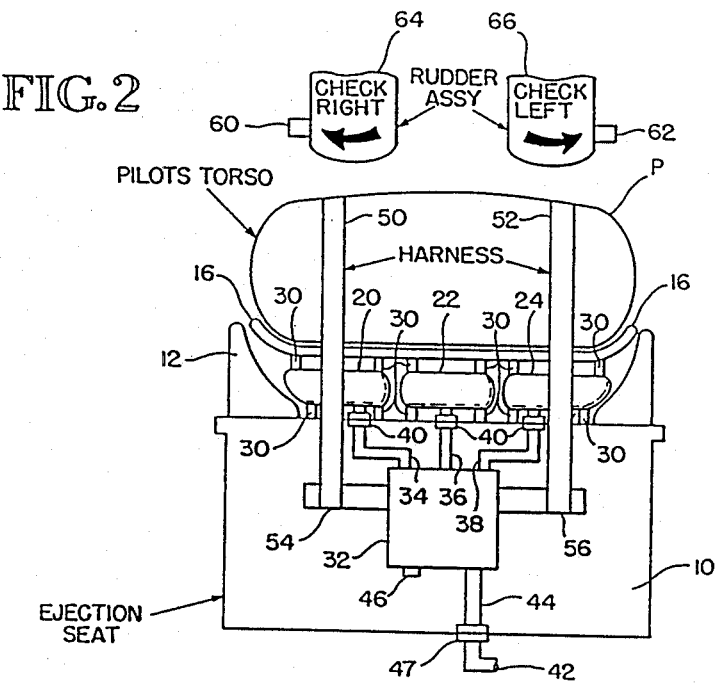
FIG. 2 is a schematic showing the mechanical details of the system of FIG. 1.

The inventive system is illustrated in greater detail in FIG. 2. The bladders 20, 22, 24 may be attached to the back of the ejection seat 10 and to the rear surface of the cushion 16 by any structure that provides for quick and easy removal, such as snaps, laces, or Velcro TM attachments 30. The bladders 20, 22, 24 are connected to a system controller 32 through respective pneumatic lines 34, 36, 38 through which the system controller 32 selectively applies compressed fluid, such as bleed air, to the bladders 20, 22, 24. The pneumatic lines 34, 36, 38 are preferably connected to the bladders 20, 22, 24 through quick-disconnect couplings 40 in order to facilitate disassembly of the system. The system controller 32 receives bleed air 42 through an inlet pneumatic line 44 having a quick-disconnect coupling 47. As explained in greater detail below, the system controller 32 selectively couples the bleed air 42 to the bladders 20, 22, 24 to inflate the bladders. When the system is deactivated, the bladders 20, 22, 24 are connected to an ambient vent 46 to allow the bladders 20, 22, 24 to deflate. Although the bladders 20, 22, 24 of the embodiment illustrated are inflated with bleed air, it will be understood that compressed air from another source or even pressurized fluids of other type, including liquids, may be used.

The pilot of a high-performance fighter aircraft is typically restrained in the ejection seat by a pair of harness straps 50, 52. In order to allow the bladders 20, 22, 24 to expand, it is necessary to provide for lengthening of the harness straps 50, 52. For this reason, the straps 50, 52 are preferably secured through respective harness reels 54, 56 of conventional design. The harness reels 54, 56 are resiliently biased in the wound direction, but hey normally rotate freely to allow the harness straps 50, 52 to individually extend when the bladders 20, 22, 24 are inflated. The reels 54, 56 are selectively locked to prevent further rotation when either the airplane decelerates rapidly or the rotational acceleration or velocity of the reels 54, 56 is above a predetermined value, but they secure the pilot P to the ejection seat 10 at all other times.

The system controller 32 may be actuated by a pair of switches 60, 62 on the left and right rudder assemblies 64, 66, respectively. When the pilot actuates the switch 60 with his left foot, the system controller 32 applies bleed air 42 to the bladders 20, 22, thereby rotating the torso of the pilot P to the right, as illustrated in FIG. 1B. When the pilot actuates the switch 62 with his right foot, the system controller 32 applies bleed air 42 to the bladders 22, 24, thereby rotating the torso of the pilot p to the left in a counterclockwise direction, as illustrated in FIG. 1C. The system controller 32 may be actuated by switches placed in other locations, such as the use of an existing or additional switch on the throttle, control stick, or other location. The bladders could, of course, be controlled by other means. For example, in a "fly-by-wire" airplane the normal rudder function could be altered automatically during high g conditions so that the bladders are controlled by actuation of the rudder pedals. Further, actuation of the system controller 32 can be mechanical, such as by physically actuating a valve to apply bleed air 42 to to the bladders 20, 22, 24.

Figure 3:
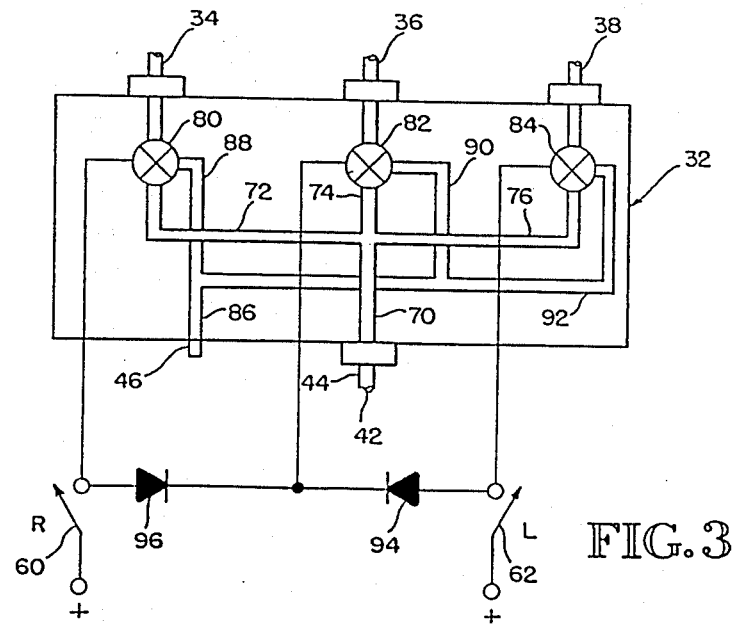
FIG. 3 is a plan view of one embodiment of a control mechanism for the system of FIGS. 1 and 2.

One embodiment of a system controller 32 is illustrated in FIG. 3. Bleed air 42 is applied through pneumatic lines 44, 70, 72, 74, 76 to conventional solenoid valves 80, 82, 84. The solenoid valves 80, 82, 84 also communicate with the ambient vent 46 through pneumatic lines 86, 88, 90 and 92. The solenoid valves 80, 82, 84 connect their respective pneumatic lines 34, 36, 38 to the ambient vent 46 in their unenergized condition. In their energized condition, however, the solenoid valves 80, 82, 84 connect the pneumatic line 44, receiving bleed air 42, to the pneumatic lines 34, 36, 38 in order to inflate the bladders 20, 22, 24.

The controller 32, illustrated in FIG. 3, is actuated by closing either switch 60 to check right or switch 62 to check left. In the event that switch 62 is closed, power is applied directly to the solenoid valve 84 and to the solenoid valve 82 through diode 94. Diode 96 is back-biased by the positive voltage from switch 62 in order to prevent the positive voltage from reaching the solenoid valve 80. Under these circumstances, the solenoid valves 82, 84 are both energized, thereby applying bleed air 42 to the conduits 36, 38 and inflating bladders 22, 24. In the event that the switch 60 is actuated to check right, a positive voltage is applied directly to solenoid 80 and to solenoid 82 through diode 96. Once again, diode 94 is back-biased to prevent power from being applied to the solenoid 84. Under these circumstances, solenoid valves 80, 82 are both energized, thereby inflating the bladders 20, 22. When the switch 60 or 62 is once again opened, the now de-energized solenoid valve 80, 82, or 84 connects the pneumatic line 34, 36, or 38 to the ambient vent 46, thereby allowing the bladder 20, 22, or 24 to deflate.

Figure 4:
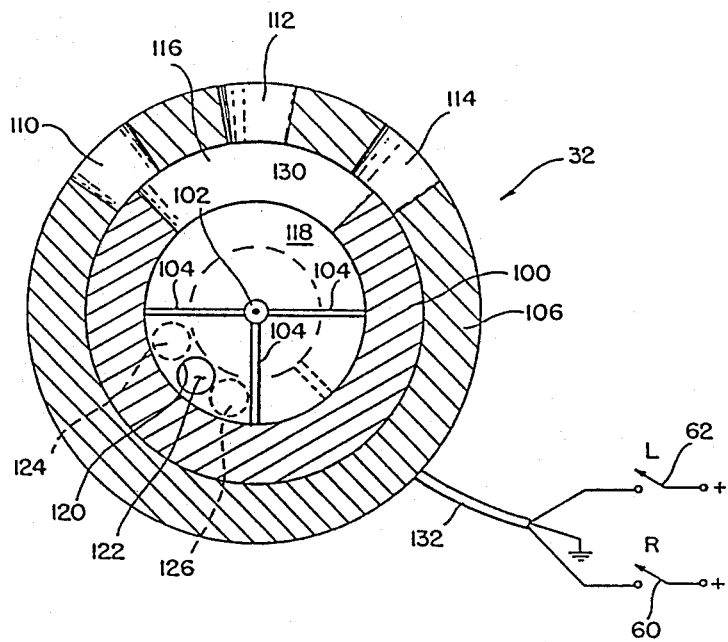
FIG. 4 is a schematic of an alternate control system for the system of FIGS. 1 and 2.

Another embodiment of a system controller 32 is illustrated in FIG. 4. In this embodiment, a rotor 100 is mounted on a shaft 102 through spokes 104 within a cylindrical housing 106. The housing 106 has formed therein three circumferentially spaced ports 110, 112, 114 that communicate with the bladders 20, 22, 24, respectively, through pneumatic lines 34, 36, 38. The rotor 100 also has a port 116 that communicates with the ports 110, 112, 114 when the rotor 100 is in the position illustrated in FIG. 4.

The axial face of the rotor 100 is closed by an end plate 118 having a port 120 that communicates with a port 122 in the housing 106 when the rotor 100 is in the position illustrated in FIG. 4. The port 122 communicates with the ambient vent 46 (FIG. 2) so that the bladders 20, 22, 24 are vented through ports 110, 112, 114 when the rotor 100 is in the position illustrated in FIG. 4.

Positioned on opposite sides of the port 122 in housing 106 are a pair of ports 124, 126 that receive bleed air 42 (FIG. 2). When the rotor 100 rotates in a clockwise direction, the edge of the rotor 100 adjacent the left edge of port 116 isolates the port 110 from the interior of the rotor 100. At the same time, port 120 in plate 118 becomes aligned with port 124 in housing 106, thereby supplying bleed air 42 to ports 112, 114 and inflating bladders 22, 24. When the rotor 100 returns to the position illustrated in FIG. 4, the ports 110, 112, 114 all communicate with the interior of the reel 100 and with the ambient vent 46 through aligned ports 120, 122.

The shaft 102, supporting the rotor 100 through spokes 104, is connected to a conventional rotary actuator 130. The actuator 130 is connected through multi-lead cable 132 to the switches 60, 62. When the switch 60 is closed, the rotary actuator 130 rotates the rotor 100 in a counterclockwise direction to pressurize bladders 20, 22, as explained above, in order to check to the right.

When the switch 62 is closed, the rotary actuator 30 rotates the rotor 100 in a clockwise direction, thereby pressurizing bladders 22, 24, as explained above, in order to check to the left.

If desired, the rotor 100 may be rotated physically by the pilot rather than by a rotary actuator 130, as illustrated in FIG. 4.

The bladders 20, 22, 24 are preferably fabricated from a resilient material so that they automatically deflate when they are coupled to the ambient vent 46. However, it is most desirable that the inflated thickness of the bladders 20, 22, 24 not be controlled by the pressure within the interior of the bladders 20, 22, 24. Making the inflated thickness of the bladders 20, 22, 24 a function of the inflating pressure would cause the center bladder 22 to inflate to the same thickness as the bladders 20, 24 when subject to the same pressure. Yet the bladder 22 should inflate to a thickness approximately half the inflated thickness of the bladders 20, 24. One design that is suitable for the bladders 20, 22, 24 is to fabricate the bladders 20, 22, 24 with a resilient casing and utilize an interior web extending between the opposed surfaces of the casing. The web should be flexible but nonresilient, so that the casing inflates to the maximum amount permitted by the web. Thereafter, the web will prevent the casing from inflating further. Thus, the inflated thickness of the bladders 20, 22, 24 will be determined by the length of the internal web.

Although bladders 20, 22, 24 described herein are inwardly tapered from top to bottom and, in the case of the outer bladders 20, 124, from outer edge to inner edge, it will be understood that bladders having other shapes may be used. Also, one or more bladders may be positioned at locations other than against the back of the pilot. For example, it may be desirable to place a center bladder behind the neck or head of the pilot.

The inventive system thus allows the pilot of a jet fighter to check the six-o'clock position when seated in an inclined position and subject to high g forces. The relative simplicity of the system makes it light in weight, reliable, and easy to maintain. Further, it is easily adapted to specific situations by allowing bladders of various thickness and system controllers of various designs to be used.

We claim:

1. An ejection seat having an ejection mechanism to eject said seat and a pilot seated in said seat from an aircraft, said seat further including a system for rotating the body of a pilot seated in said airplane seat under high g conditions to allow observation toward the six-o'clock position, said system comprising:
    first and second resilient bladders positioned on the back of said seat, said bladders being spaced transversely across and supporting the back of said pilot;
    a source of compressed fluid; and
    control means for differentially inflating and deflating said bladders so that said first bladder is selectively inflated to a degree that is greater than any inflation of said second bladder, whereby the differential inflation of said bladders rotates the torso of said pilot away from said first bladder and toward said second bladder to allow said pilot to check the six-o'clock position under high g conditions.

2. The system of claim 1 wherein said control means further selectively inflates said second bladder to a degree that is greater than any inflation of said first bladder so that the torso of said pilot may be rotated in either direction.

3. The system of claim 1 wherein said second bladder remains entirely uninflated when said first bladder is inflated.

4. The system of claim 1, further including a third bladder positioned between said first and second bladders, said third bladder being inflated to a degree that is less than the inflation of said first bladder and greater than the inflation of said second bladder so that when the torso of said pilot is rotated, it is more evenly supported by said bladders.

5. The system of claim 1 wherein said control means further selectively inflates said second bladder to a degree that is greater than the inflation of said first bladder, and said control means selectively inflates said third bladder to a degree that is greater than the inflation of said first bladder and less than the inflation of said second bladder so that the torso of said pilot may be rotated in either direction.

6. The system of claim 5 wherein said control means comprise three-position valve means connecting said first, second, and third bladders to a deflation vent in a first position, connecting said first and second bladders to said source of compressed fluid in a second position, and connecting said second and third bladders to said source of compressed fluid in a third position, said second bladder having an inflated thickness that is less than the inflated thickness of said first and second bladders.

7. The system of claim 5 wherein said control means is a valve having a first fluid port communicating with said first bladder, a second fluid port communicating with said second bladder, a third fluid port communicating with said third fluid bladder, a fourth fluid port communicating with said source of compressed fluid, and a fifth fluid port communicating with a deflation vent, said valve connecting said first, second, and third ports to said fifth port in a first position, said valve connecting said first and second ports to said fourth port in a second position, and said valve connecting said second and third ports to said fourth port in a third position, said second bladder having an inflated thickness that is less than the inflated thickness of said first and second bladders.

8. The system of claim 7 wherein said system further includes a rotary actuator rotating said valve between its first, second, and third positions, and a manually actuated controller selectively energizing said rotary actuator to move said valve between its first, second, and third positions.

9. The system of claim 8 wherein said airplane includes left and right rudder pedals, and wherein said controller further includes a first foot-actuatable switch mounted on said left rudder pedal and a second foot-actuatable switch mounted on said right rudder pedal, said controller causing said rotary actuator to move said valve from its first position to its second position when said first switch is actuated and from its first position to its third position when said second switch is actuated.

10. The system of claim 1 wherein said airplane includes left and right rudder pedals, and wherein said control means further includes a foot-actuatable switch mounted on one of said rudder pedals, said control means differentially inflating said bladders responsive to actuation of said switch.

11. The system of claim 1, further including a pair of harness straps adapted to restrain the movement of said pilot away from said seat, said harness straps being wound on inertia harness reels that are resiliently biased in the wound direction, said harness reels being normally free to rotate against said resilient bias but being locked to prevent rotation responsive to either rapid deceleration of said airplane or rapid acceleration or rotation of said reels.

* * * * *